United States Patent [19]

Allaire et al.

[11] 4,304,803

[45] Dec. 8, 1981

[54] FLOATING VANES FOR FLAT PANEL DISPLAY SYSTEM

[75] Inventors: Roger A. Allaire, Big Flats; Wendell S. Blanding, Painted Post, both of N.Y.

[73] Assignee: Corning Glass Works, Corning, N.Y.

[21] Appl. No.: 965,588

[22] Filed: Dec. 1, 1978

[51] Int. Cl.[3] .................. B32B 17/06

[52] U.S. Cl. .................. 428/34; 428/69; 428/72; 428/119; 428/120; 428/35

[58] Field of Search .................. 65/33; 428/119, 120, 428/72, 69, 34, 35; 220/21 A, 435, 437, 436, 475; 52/790, 573, 397, 398, 304; 313/183, 185, 186, 187, 422, 477 R; 126/450, 444, 446

[56] References Cited

U.S. PATENT DOCUMENTS

| | | | |
|---|---|---|---|
| 1,561,769 | 11/1925 | Ballen | 220/425 |
| 1,566,221 | 12/1925 | Lindemuth | 220/425 |
| 2,327,265 | 8/1943 | Herr | 428/119 |
| 3,392,866 | 7/1968 | Alleaume | 220/437 |
| 3,425,585 | 2/1969 | Lathar | 220/437 |
| 3,507,737 | 4/1970 | Busdiecker et al. | 65/33 |
| 3,535,098 | 10/1970 | Babcock | 65/33 |
| 3,661,546 | 5/1972 | Busdiecker et al. | 65/33 |
| 3,936,553 | 2/1976 | Rowe | 428/119 |
| 3,995,615 | 12/1976 | Hojnowski | 126/444 |
| 4,029,984 | 6/1977 | Endriz | 313/422 |
| 4,038,965 | 8/1977 | Lyon | 126/446 |
| 4,099,085 | 7/1978 | Endriz et al. | 313/422 |
| 4,132,218 | 1/1979 | Bennett | 428/34 |
| 4,166,233 | 8/1979 | Stanley | 313/422 |

FOREIGN PATENT DOCUMENTS

| | | | |
|---|---|---|---|
| 2207581 | 6/1974 | France | 428/69 |

*Primary Examiner*—Stanley S. Silverman
*Attorney, Agent, or Firm*—Burton R. Turner

[57] ABSTRACT

In a flat panel display system including a polyhedral enclosing housing structure having opposed front and back panels, which structure requires a subatmospheric or evacuated environment for the performance of the electronic components contained therein, a plurality of substantially parallel transversely spaced apart and longitudinally extending supporting vanes are fixtured within said housing between said front and back panels for limited movement within said housing prior to evacuating the interior thereof and for engagably supporting said front and back panels against the forces generated by atmospheric pressure when said interior is evacuated.

5 Claims, 4 Drawing Figures

FLOATING VANES FOR FLAT PANEL DISPLAY SYSTEM

BACKGROUND OF THE INVENTION

For some time now, it has been the dream of the television set manufacturers to be able to commercially produce lightweight large screen TV systems. However, in view of the fact that the electronic components of such systems require an evacuated environment, it has not been possible to produce such a large lightweight flat panel TV system which could withstand the high atmospheric forces acting thereon. That is, when a relatively large shallow structure is evacuated, an atmospheric pressure of approximately one ton per square foot is exerted upon the enclosure structure, and if the base plate and face plate of such structure were each about eight square feet in area, then such plates would be subjected to a total atmospheric pressure of about sixteen tons. In order to produce a face plate of such size from television glass which could withstand such pressures without central support, it would be necessary to make the glass face plate approximately six inches thick, which of course would be completely absurd in view of the mass, weight and cost involved.

The use of supports in evacuated housings for supporting large panel areas is generally known in the art as shown by U.S. Pat. Nos. 3,995,615 and 4,038,965 pertaining to evacuated solar heat collectors. In U.S. Pat. No. 3,995,615, a plurality of posts project upwardly from the base to withstand the atmospheric pressure exerted on the transparent cover; whereas in U.S. Pat. No. 4,038,965, a plurality of load bearing partitions are proportioned and spaced so as to withstand pressure of more than one ton per square foot on the enclosure, the cover of which is of transparent material such as glass or clear plastic. It would appear from the drawings of both of the foregoing patents, that the structures thereof, including the posts and partitions, are made of a durable plastic, sealed at various intersecting joints to form a composite unit.

However, when attempts were made to heat seal a plurality of partitions or vanes within a flat glass plate panel TV system, so as to provide support for both the base plate and face plate thereof, it was found that the thermal gradients generated during the sealing of the vanes imposed an impossible stress on the structure causing breakage of the vanes and the structure. In view of the fact that the vanes were fixed to the base plate and not allowed to expand independently of the external housing structure, the stresses generated by the different expansion rates produced by the thermal gradients occasioned during the sealing cycle, produced catastrophic results in the breakage occurred within the vanes and between the vanes and the housing structure.

The present invention eliminates the problem of glass breakage occasioned in the sealing of fixed support vanes within a large flat panel TV structure by utilizing a plurality of floating vanes within such structure, which are fixtured therewithin in such a manner so as to permit limited movement during the sealing of the structure and to positively engage and support the base plate and face plate thereof when the structure is subjected to subatmospheric pressures.

SUMMARY OF THE INVENTION

In its simplest form, the present invention sets forth a completely new concept in providing support for a front or face plate panel and a back or base panel of a large evacuated flat plate TV display system so that such face plate and base plate may withstand the forces exerted thereon by atmospheric pressure which may be as high as approximately one ton per square foot. The improvement resides in the fact that a plurality of relatively thin, substantially parallel, longitudinally extending and transversely spaced apart support vanes are fixtured within the housing of a large flat panel TV display system between the viewing front panel and the base panel for limited movement within such housing prior to evacuating the interior thereof, and for supporting central portions of the front and base panels against the forces generated by atmospheric pressure when such interior is evacuated.

It thus has been an object of the present invention to obviate the problems of breakage encountered in the prior art processes of sealing vanes within a glass housing, by mounting or fixturing such vanes within such housing for limited movement therewithin during the sealing of the housing structure and thus eliminating the detrimental effects produced by the thermal gradients when sealing rigid vanes within such a structure.

DESCRIPTION OF THE PREFERRED EMBODIMENTS

Figure 1:
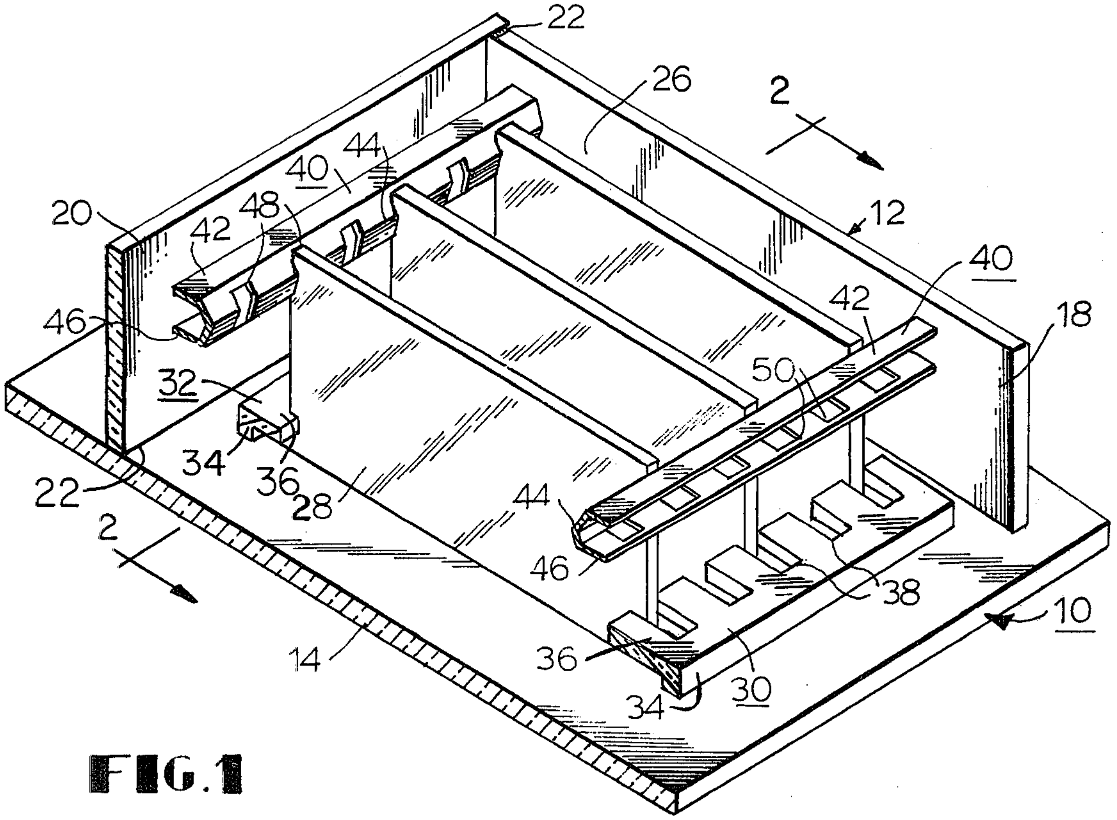
FIG. 1 is an isometric view of a housing for a large flat panel TV display system including the floating support vane mounting means of the present invention, but with the face plate and a side and end panel removed.
Figure 4:
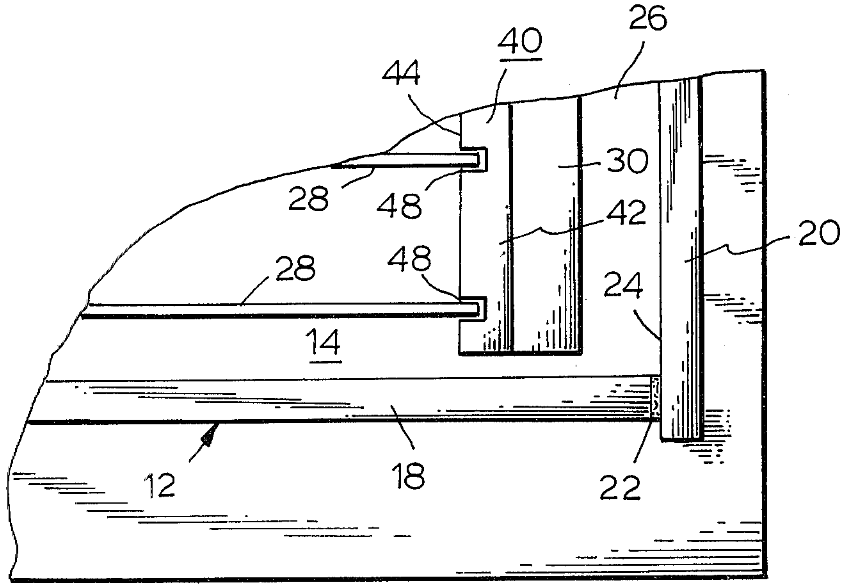
FIG. 4 is a fragmental top plan view of a corner of the housing with the face plate removed.

Referring now to the drawings, a flat panel display device 10 is shown comprising a housing structure 12 which includes a base plate or back panel 14, a viewing face plate or front panel 16, a pair of side panels 18 and a pair of end panels 20 which are all hermetically sealed together along adjacent intersections or abutting joints 22 with a suitable sealant such as frit material 24.

The housing 12 forms an enclosed chamber 26 for the electronic components of the display device, such as shown in U.S. Pat. No. 4,101,802 and which are omitted herefrom for the sake of clarity as they form no part of the present invention. It will be understood, however, that such electronic components are positioned within the chamber 26 prior to the final sealing operation, and that the pressure within the chamber is subsequently drawn down to a subatmospheric pressure to produce a desired degree of vacuum within chamber 26. In order to support the expanse of base plate 14 and face plate 16 against the forces of atmospheric pressure exerted thereon, a plurality of floating support vanes 28 are also fixtured within the chamber 26 prior to sealing the structure. In view of the fact that varying thermal gradients inherently produced within the structure during the sealing operation cause differential expansions between the vanes and the sealing structure, the vanes must be so mounted within the structure so as to permit limited movement thereof to compensate for such differential expansions and thereby avoid the catastrophic breakage which results when such vanes are rigidly secured to the structure.

Accordingly, a pair of opposed vane supports 30, 32 are fixedly secured in position relative to base plate 14, such as by frit material 24, so as to lie substantially parallel with end panels 20. Both vane support 30 and 32 have a rearward base portion 34 and a forwardly extending notched portion 36 spaced from base panel 14. The notched portion 36 has a plurality of vane-receiving notches or slots 38 formed in its forward face and extending vertically therethrough.

A pair of upper vane supports 40 are secured in position relative to face plate 16 in vertical alignment above vane supports 30 and 32. Although other suitable shapes and positioning means may be utilized, each support 40 may have a C shape as shown, with a flattened upper mounting portion 42 secured to the face plate 16 such as by a suitable frit material, a slotted curved central portion 44 and a flattened lower portion 46. A plurality of slots 48 are formed in the central curved portion 44 of vane supports 40 in vertical alignment with the slots 38 formed in vane supports 30 and 32. The slots 48 are shown having a tapered opening 50 extending into the lower portion 46 to facilitate the positionment of the upper portion 29 of vanes 28, which upper portion may be in the form of a metal vane tip.

The housing structure 12 may be formed of quarter inch sheet glass, whereas the vanes 28, which may be spaced approximately one inch apart, may have a glass sheet thickness of about 0.06 inches. The vane supports 30 and 32 may be formed of glass or metal, whereas the upper vane supports 40 are preferably formed of metal. Although only one vane support is shown at the top and bottom of each end of the vanes 28, it will be appreciated that if the width of the housing 12 were extended so as to lengthen end panels 20, a plurality of spaced-apart but longitudinally aligned vane supports 30 and a plurality of spaced apart but longitudinally aligned vane supports 32 may be positionably secured to the appropriately extended base plate 14, and that also a plurality of spaced apart but longitudinally aligned vane supports 40 may be positionably secured to the similarly extended face plate 16. Thus, by providing a plurality of discontinuous, but longitudinally aligned vane supports which are fixedly positioned such as by frit sealing to the base plate and front plate of the housing structure, differential thermal gradients along the extent of such vane supports are minimized so as to avoid catastrophic failure. The vane supports may also serve additional functions such that the wider vane support 30 may serve as a modulator, and/or as a grid alignment means, whereas vane support 32 may also function as a grid alignment means, with the metal vane supports 40 further functioning as a mask support.

As previously stated, after all of the electronic components have been positioned within the chamber 26 defined by housing 12, and support vanes 28 have been positioned within the notches 38 of vane supports 30 and 32, the side and end panels are assembled and face plate 16 having vane supports 40 secured thereto is positioned upon the side panels 18 and end panels 20 to complete the structure. Prior to the positionment of the face plate panel 16 upon the end and side panels, the support vanes 28 are initially held in position by vane supports 30, 32 and various electronic components which may be positioned therebetween, however, upon the assembly of face plate 16, the upper metal tip portions 29 of the vanes 28 are guided by tapered openings 50 into slots 48 of the upper vane supports 40 to fixedly position such vane supports within the chamber 26 for limited movement therewithin. Thus, as the various panels of the housing 12 are heat-sealed together along their abutting intersections or joints 22 by means of fusible frit material 24, the floating support vanes 28 are free to expand and contract independently of the housing structure 12 and thereby avoid thermal breakage due to differential thermal gradients generated during the sealing operation.

Figure 2:
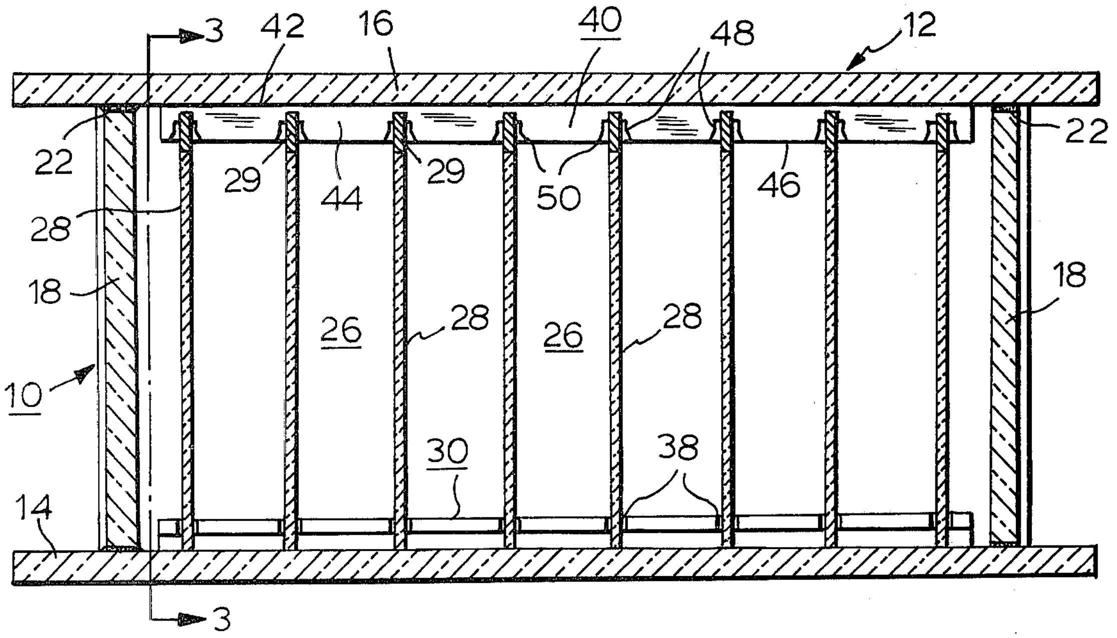
FIG. 2 is a sectional view in elevation taken along line 2—2 of FIG. 1 and showing the remainder of the housing.
Figure 3:
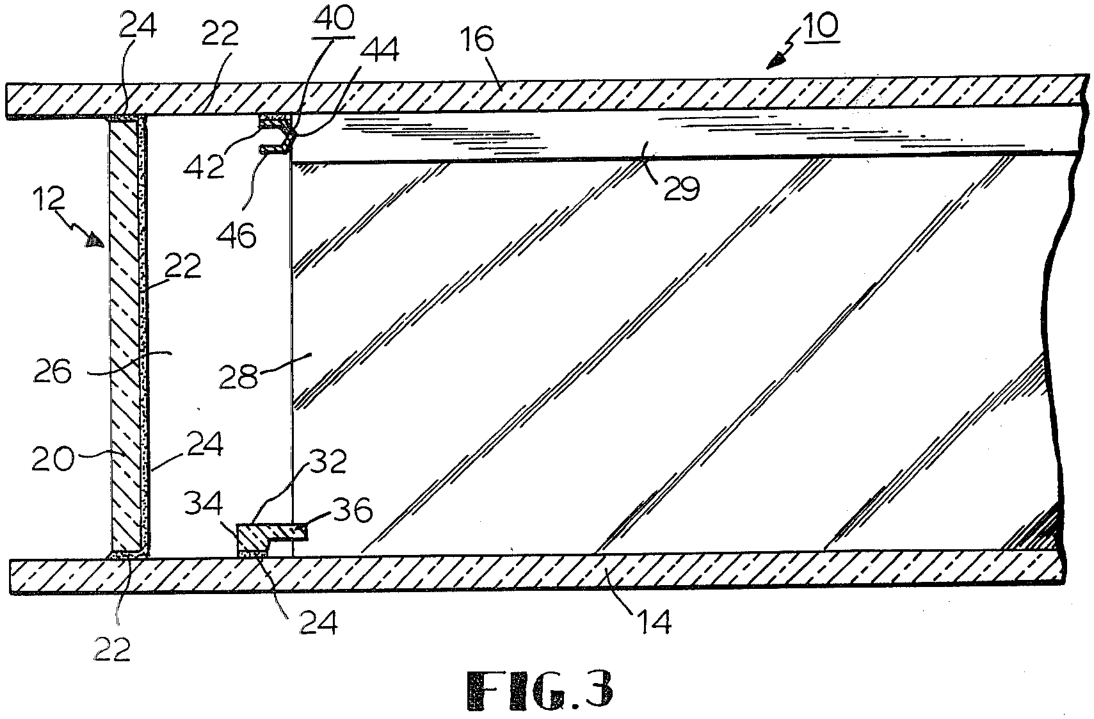
FIG. 3 is a fragmental side elevational view in section as would be seen looking along line 3—3 of FIG. 2.

As noted in FIGS. 1 and 3, the longitudinal ends of the support vanes 28 are positioned inwardly of the end walls 20, and thus are not constrained thereby, and as also shown in FIG. 2, during the sealing operation and prior to evacuating the chamber 26, the upper metal tip portion 29 of support vanes 28 is spaced from the face plate 16 so as to provide a small gap therebetween thus allowing limited vertical movement of the vanes during the sealing operation. However, when the chamber 26 is subjected to a vacuum, the atmospheric pressure exteriorly of the housing 12 forces the base panel 14 and face panel 16 inwardly against the longitudinal edges of the vanes as shown in FIG. 3. The support vanes 28 are thus held rigidly in position after the vacuum is applied to chamber 26, and the precise alignment provided by vane supports 30, 32 and 40 is maintained upon the application of subatmospheric pressure to the chamber 26 and the vane supports positioned substantially perpendicular to the front and back panels maintain the structural integrity of back panel 14 and face panel 16 against the forces exerted by atmospheric pressure. Further, the metal tip portions 29, being malleable, deform and provide a continuous complimentary engagement with the face plate 16 and thus prevent cracking or crizzling which may otherwise be occasioned where a glass-to-glass contact be utilized.

Although the now preferred embodiments of the invention have been disclosed, various changes and modifications may be made thereto without departing from the spirit and scope thereof as defined in the appended claims.

I claim:

1. An evacuated flat panel device comprising an enclosing sealed vitreous housing structure having opposed front and back panels, supporting means in the form of glass sheets positioned within said housing extending between said front and back panels for supporting central portions of said panels, and means for mounting said supporting means within said housing between said front and back panels in spaced relation with at least one of said panels and with limited movement with respect to said panels prior to evacuating air from the interior of said housing and for firmly engaging and supporting said front and back panels against the forces generated by atmospheric pressure when said interior is at least partially evacuated.

2. A flat panel device as defined in claim 1 wherein said enclosing housing structure is formed from a plurality of glass sheets sealed together at their intersections, and said supporting means includes a plurality of relatively thin, non-intersecting, substantially parallel, transversely spaced-apart and longitudinally extending glass sheets positioned in a non-sealed relationship within said housing substantially perpendicular to said opposed front and back panels.

3. A flat panel device as defined in claim 1 or 2 wherein said supporting means includes a plurality of longitudinally extending glass vanes having a metal tip portion extending longitudinally therealong adjacent said front panel, and said metal tip being malleable so as to deform and provide continuous complementary engagement with said front panel upon evacuation of said interior.

4. A flat panel device as defined in claim 1 wherein said mounting means includes a first pair of vane supports secured to said front panel and a second pair of vane supports secured to said back panel, said first and second vane supports having slot means for receiving portions of said supporting means therewithin and for initially positioning such supporting means within said housing in spaced relation with said front panel for limited movement with respect to such housing.

5. A flat panel device as defined in claim 4 wherein at least one of said first and second pairs of vane supports is formed of metal, and said slot portions formed in said first and second pair of vane supports are in vertical alignment with one another.

* * * * *